US012700629B2

(12) United States Patent
Piggott

(10) Patent No.: US 12,700,629 B2
(45) Date of Patent: Aug. 4, 2026

(54) ELECTRICALLY INSULATIVE AND THERMALLY CONDUCTIVE PARALLEL BATTERY COOLING AND TEMPERATURE CONTROL SYSTEM

(71) Applicant: Applied Thermoelectric Solutions, LLC, Novi, MI (US)

(72) Inventor: Alfred J. Piggott, Novi, MI (US)

(73) Assignee: Applied Thermoelectric Solutions, LLC, Novi, MI (US)

( * ) Notice: Subject to any disclaimer, the term of this patent is extended or adjusted under 35 U.S.C. 154(b) by 20 days.

(21) Appl. No.: 18/139,450

(22) Filed: Apr. 26, 2023

(65) Prior Publication Data

US 2023/0387501 A1      Nov. 30, 2023

Related U.S. Application Data

(62) Division of application No. 16/835,816, filed on Mar. 31, 2020, now Pat. No. 11,670,813.

(Continued)

(51) Int. Cl.
H01M 10/6555      (2014.01)
H01M 10/42      (2006.01)
(Continued)

(52) U.S. Cl.
CPC ...  H01M 10/6555 (2015.04); H01M 10/4257 (2013.01); H01M 10/486 (2013.01);
(Continued)

(58) Field of Classification Search
CPC ......... H01M 10/6555; H01M 10/4257; H01M 10/486; H01M 10/63; H01M 50/147;
(Continued)

(56) References Cited

U.S. PATENT DOCUMENTS 5,197,291  A      3/1993  Levinson
5,229,702  A      7/1993  Boehling et al.
(Continued)

FOREIGN PATENT DOCUMENTS

CN      108644713      * 10/2018
DE      102013114188 A1      6/2014
(Continued)

OTHER PUBLICATIONS

Automotive News, "2019 Automotive News Pace Awards", Gentherm, Inc., 2019 Automotive News Pace Awards, https://www.autonews. com/awards/2018-finalist-gentherm-inc-thermoelectric-battery-thermal-management, 2019, 4 pages.

(Continued)

*Primary Examiner* — Lisa S Park
(74) *Attorney, Agent, or Firm* — Blanchard Horton PLLC

(57)      ABSTRACT

A battery is provided having heat transfer bars that directly transfer heat between the interior layers of a battery cell and the case that encloses the battery cell. The battery does not transfer significant heat from its interior layers to the posts of the battery that reside outside of the battery case. A temperature-controlled power system also is provided that uses multiple, active thermoelectric devices paired with multiple batteries to provide individual temperature control of the individual batteries forming the power system. The multiple, active thermoelectric devices preferably transfer heat to a single radiator on each side of the power system. A method of transferring heat from a battery interior using conductive, active, and convective heat transfer is also described.

29 Claims, 6 Drawing Sheets

Related U.S. Application Data

(60) Provisional application No. 62/827,799, filed on Apr. 1, 2019.

(51) Int. Cl.

| | |
|---|---|
| *H01M 10/48* | (2006.01) |
| *H01M 10/63* | (2014.01) |
| *H01M 50/147* | (2021.01) |
| *H01M 50/186* | (2021.01) |
| *H01M 50/24* | (2021.01) |
| *H01M 50/534* | (2021.01) |
| *H01M 50/209* | (2021.01) |
| *H01M 50/249* | (2021.01) |
| *H01M 50/533* | (2021.01) |

(52) U.S. Cl.
CPC ......... *H01M 10/63* (2015.04); *H01M 50/147* (2021.01); *H01M 50/186* (2021.01); *H01M 50/24* (2021.01); *H01M 50/534* (2021.01); *H01M 50/209* (2021.01); *H01M 50/249* (2021.01); *H01M 50/533* (2021.01)

(58) Field of Classification Search
CPC .. H01M 50/186; H01M 50/24; H01M 50/534; H01M 50/209; H01M 50/249; H01M 50/533; H01M 50/528; H01M 10/425; H01M 10/613; H01M 10/653; H01M 10/654; H01M 10/6556; H01M 10/6572; H01M 50/103; H01M 50/15; H01M 10/6553; Y02E 60/10
See application file for complete search history.

(56) References Cited

U.S. PATENT DOCUMENTS

| | | | |
|---|---|---|---|
| 6,312,851 B1* | 11/2001 | Fukuda | H01M 10/625 |
| | | | 429/57 |
| 8,329,323 B2 | 12/2012 | Atkinson et al. | |
| 8,703,320 B2 | 4/2014 | Sohn | |
| 9,312,580 B2 | 4/2016 | Nguyen et al. | |
| 9,620,827 B2 | 4/2017 | Houchin-Miller et al. | |
| 9,666,907 B2 | 5/2017 | Wang et al. | |
| 9,666,914 B2 | 5/2017 | Bell et al. | |
| 9,671,142 B2 | 6/2017 | Kossakovski et al. | |
| 9,899,711 B2 | 2/2018 | Piggott et al. | |
| 10,236,547 B2 | 3/2019 | Kossakovski et al. | |
| 11,670,813 B2 | 6/2023 | Piggott | |
| 2005/0116685 A1* | 6/2005 | Liu | H01M 50/247 |
| | | | 320/116 |
| 2006/0110657 A1 | 5/2006 | Stanton | |
| 2008/0311466 A1* | 12/2008 | Yang | H01M 10/6572 |
| | | | 429/62 |
| 2012/0034499 A1 | 2/2012 | Meehan | |
| 2012/0125447 A1 | 5/2012 | Fuhr et al. | |
| 2012/0153901 A1 | 6/2012 | Hermann et al. | |
| 2014/0023894 A1 | 1/2014 | Jansen et al. | |
| 2014/0023897 A1 | 1/2014 | Suga | |
| 2014/0220391 A1* | 8/2014 | Fujii | H01M 50/264 |
| | | | 429/7 |
| 2015/0116943 A1 | 4/2015 | Olsson et al. | |
| 2015/0340746 A1 | 11/2015 | Origuchi et al. | |
| 2015/0357692 A1* | 12/2015 | Piggott | H02J 7/0068 |
| | | | 29/623.2 |
| 2017/0271728 A1 | 9/2017 | Kossakovski et al. | |
| 2017/0271729 A1 | 9/2017 | Hirsch et al. | |
| 2017/0284709 A1 | 10/2017 | Hirsch et al. | |
| 2017/0338535 A1 | 11/2017 | Bhoir | |
| 2019/0020081 A1 | 1/2019 | Spillner | |
| 2019/0173138 A1 | 6/2019 | Tian | |
| 2019/0312238 A1 | 10/2019 | Poscharnig et al. | |
| 2020/0266327 A1 | 8/2020 | Jovovic et al. | |
| 2020/0313261 A1 | 10/2020 | Piggott | |
| 2021/0167446 A1* | 6/2021 | Lee | G01R 19/16542 |

FOREIGN PATENT DOCUMENTS

| | | |
|---|---|---|
| EP | 1153803 A2 | 11/2001 |
| JP | 2013222680 A | 10/2013 |
| JP | 2017126418 A | 7/2017 |
| KR | 100772201 B1 | 11/2007 |
| WO | 2017052194 A1 | 3/2017 |
| WO | 2019232556 A1 | 12/2019 |

OTHER PUBLICATIONS

Flik, Markus , "Thermal Management for Hybrid Vehicles", Behr Gmbh & Co. KG, Stuttgart, Germany, 2009, 1-11.

* cited by examiner

ELECTRICALLY INSULATIVE AND THERMALLY CONDUCTIVE PARALLEL BATTERY COOLING AND TEMPERATURE CONTROL SYSTEM

REFERENCE TO RELATED APPLICATIONS

This application is a division of U.S. Nonprovisional application Ser. No. 16/835,816, filed Mar. 31, 2020, entitled "Electrically Insulative and Thermally Conductive Parallel Battery Cooling and Temperature Control System", which claims the benefit of U.S. Provisional Application No. 62/827,799 entitled "System and Method for Battery Thermal Management" filed Apr. 1, 2019, both of which are incorporated by reference in the entirety.

BACKGROUND

Lithium ion and similar battery types generate significant heat during charging and discharging, especially with rapid charging or discharging as common in automotive power applications. To manage heat removal in the automotive battery context, air and liquid flows have been used to remove heat from the batteries. Conduction of heat from the batteries into thermoelectric materials that then actively transfer the heat to air or fluid flows also have been used to remove heat from the batteries.

Cells for automotive use batteries may be built up by rolling a continuous sheet having a cathode layer, an electrically insulative separator layer, and an anode layer sandwiched between electrically insulating polymeric exterior layers. By rolling the continuous multi-layer sheet around an interior frame that is then removed to leave a central void, multiple layers of the polymeric exterior are in contact, resulting in a "jelly roll" battery cell. The bare, electrically conductive anode and cathode layers protrude at opposite ends of the jelly roll, as the opposing ends of the continuous sheet lack the electrically insulative polymeric exterior layers. Folding the polymeric exterior continuous sheet at fixed intervals back onto itself in a Z-pattern can provide a similar battery cell in the form of a flat stack as opposed to a roll—similarly to Post-It™ notes. Thus, the cell of the resulting battery can have a central void if formed as a roll, or can be formed as a solid stack if folded onto itself.

A cooling method relying on heat transfer through the contacting electrically insulative polymeric exterior layers of the sheet of the roll or stack has the issue that the only way that heat from the interior layers of the cell can reach the exterior of the cell is by passing through multiple layers of polymeric material, which in addition to being an electrical insulator, is a thermal insulator. This type of heat transfer may be thought of as serial heat transfer as heat must pass from an interior layer through additional interior layers to reach an exterior layer, so the heat can be removed from the outermost polymeric exterior layer by the cooling system. Thus, the flat stack can transfer heat from the bottom and top flat, exterior surfaces and a roll can transfer heat to the exterior surfaces outside and inside the roll, but there is no way with either construction to directly transfer heat from the interior layers for the roll or stack without the heat first having to transfer through additional interior layers to reach an exterior layer.

The only way to directly transfer heat from the interior layers of the cell is through the cathode and anode layers residing in each layer of the rolled or folded sheet. As the cathode and anode materials are often electrically conductive metals, with aluminum forming the cathode (where reduction occurs) and copper forming the anode (where oxidation occurs) for example, a direct heat transfer pathway exists from the interior layers of the cell out through the cathode and anode layers, which are not covered by the polymeric material. Transferring heat from these protruding electrically and thermally conductive surfaces may be referred to as parallel heat transfer as heat is being transferred directly from multiple interior layers simultaneously to the exterior surfaces that form the cathode and anode.

An issue with conventional parallel heat transfer techniques, which transfer heat from the interior cathode and anode layers of the cell, is that when the cell is turned into a battery the cathode and anode layers are electrically and thermally connected to relatively small surface area electrodes or "posts". Thus, the interior cell heat transfers from the relatively large surface areas of the cathode and anode of the cell to the smaller surface area posts residing external to the cell of the battery. In this way the exposed posts of the battery serve as "cold fingers" in relation to the interior layers of the battery cell. Conventionally, bus bars and other thermally conductive components are then attached to the battery posts residing external to the battery, which provide the surface area from which the heat is removed. However, the contact area establishing electrical conductivity between the battery posts and the cathode and anode of the cell limits the rate at which heat may be transferred from the interior layers of the battery to the bus bars and/or other thermally conductive components residing external to the battery.

Conventional parallel heat removal techniques also exist where a thermally conductive tube is clamped to the cathode and/or anode of the cell where an aqueous liquid is passed through the tube to remove the heat from the cathode and/or anode. This design does not limit heat transfer from the interior layers of the battery with the connection between the cathode and anode electrode posts being a choke point as the previously discussed "post only" conventional designs. However, these "internal liquid" designs suffer from being difficult to manufacture as the tube must be made from a thermally but not electrically conductive material to prevent shorting between the cathode and/or anode and the circulating liquid. Furthermore, especially in automotive applications, as the liquid is in close proximity to the battery cell, such designs have a high probability of the aqueous liquid coming in contact with the cathode, anode, and/or cell materials and causing extreme heating and fire if the battery is damaged in an accident.

As can be seen from the above description, there is an ongoing need for simple and efficient designs and materials to cool batteries during charging and discharging, especially in the context of lithium ion batteries used in automotive power applications. The designs, devices, and materials of present invention overcome at least one of the disadvantages associated with conventional devices.

SUMMARY

The present design provides a battery with or without active cooling provided by thermoelectric devices and/or a heat transfer fluid that makes possible high battery charge and discharge rates, thus extreme fast charging and discharging, without overheating the cell of the battery. The design enables longer and thicker cells to be used in constructing the battery, significantly improved cell life, and ease of manufacture and assembly.

The present design of a temperature-controlled power system provides many benefits, including nearly silent operation, high capacity cooling and heating in one unit, lower parasitic heat loads in relation to conventional systems, reduced temperature gradients between batteries, and the ability to simultaneously heat and cool different batteries.

In one aspect, the invention provides a battery including a parallel heat transfer system, where the battery includes a case comprising a can attached to a lid; a cell having first and second electrodes exposed from an exterior layer of polymeric material of the cell, the at least two electrodes comprising an anode electrode and a cathode electrode, where the case encloses the cell; at least two posts exposed from the case; at least two contacts enclosed by the case, where a first of the at least two posts is in electrical communication with a first of the at least two contacts and a second of the at least two posts is in electrical communication with a second of the at least two contacts; and at least a first heat transfer bar in electrical and thermal communication with the first electrode and the first of the at least two contacts, where the first heat transfer bar comprises a first side that is thermally and electrically conductive and a second side that is thermally but not electrically conductive. The battery may include a second heat transfer bar configured similarly to the first.

In another aspect of the invention, there is a temperature-controlled power system, the temperature-controlled power system includes batteries; and a thermal transfer system, where the thermal transfer system includes at least one circuit board; control circuitry in electrical or wireless communication with the at least one circuit board; at least two active thermoelectric devices held by the at least one circuit board, where each of the at least two active thermoelectric devices contacts and is in thermal communication with a different battery; and at least one radiator in conductive heat transfer with the at least two active thermoelectric devices. The power system may include additional active thermoelectric devices in a second circuit board that contact a second radiator on the opposite side of the batteries.

In another aspect of the invention, method of transferring heat from a battery cell to surrounding air includes generating heat from the interior layers of a cell by flowing current into or out of the cell; conductively transferring the heat from cathode and anode layers of the interior layers of the cell to an exterior cathode electrode of the cell and to an exterior anode electrode of the cell; conductively transferring the heat from at least one of the electrodes to a heat transfer bar contacting the at least one of the electrodes; conductively transferring the heat from the heat transfer bar through a thermally conductive and electrically insulative material into an interfacing face of the heat transfer bar; conductively transferring the heat from the interfacing face into a can of the battery; conductively transferring the heat from the can of the battery to a cold side of an active thermoelectric device, where the active thermoelectric device transfers the heat from the cold side to a hot side; conductively transferring the heat from the hot side of the thermoelectric device to a radiator, where the radiator convectively transfers the heat to surrounding air. The radiator may conductively transfer the heat to a heat transfer fluid that convectively transfers the heat to the surrounding air after the heat transfer fluid leaves the radiator.

Other systems, methods, features and advantages of the invention will be, or will become, apparent to one with skill in the art upon examination of the following figures and detailed description. It is intended that all such additional systems, methods, features, and advantages be included within this description, be within the scope of the invention, and be protected by the claims that follow. The scope of the present invention is defined solely by the appended claims and is not affected by the statements within this summary.

BRIEF DESCRIPTION OF THE FIGURES

The invention can be better understood with reference to the following drawings and description. The components in the figures are not necessarily to scale, emphasis instead being placed upon illustrating the principles of the invention.

DETAILED DESCRIPTION

A battery is provided having heat transfer bars that directly transfer heat between the interior layers of a battery cell and the case enclosing the battery cell. The battery does not transfer significant heat from its interior layers to the posts of the battery that reside outside of the battery case. A temperature-controlled power system also is provided that uses multiple, active thermoelectric devices paired with multiple batteries to provide individual temperature control of the individual batteries forming the power system. The multiple, active thermoelectric devices preferably transfer heat to a radiator on each side of the power system. While the application is written mostly in the context of cooling a battery or batteries, the battery or batteries could likewise be heated by supplying heat to the thermal transfer system from an exterior source.

Figure 1:
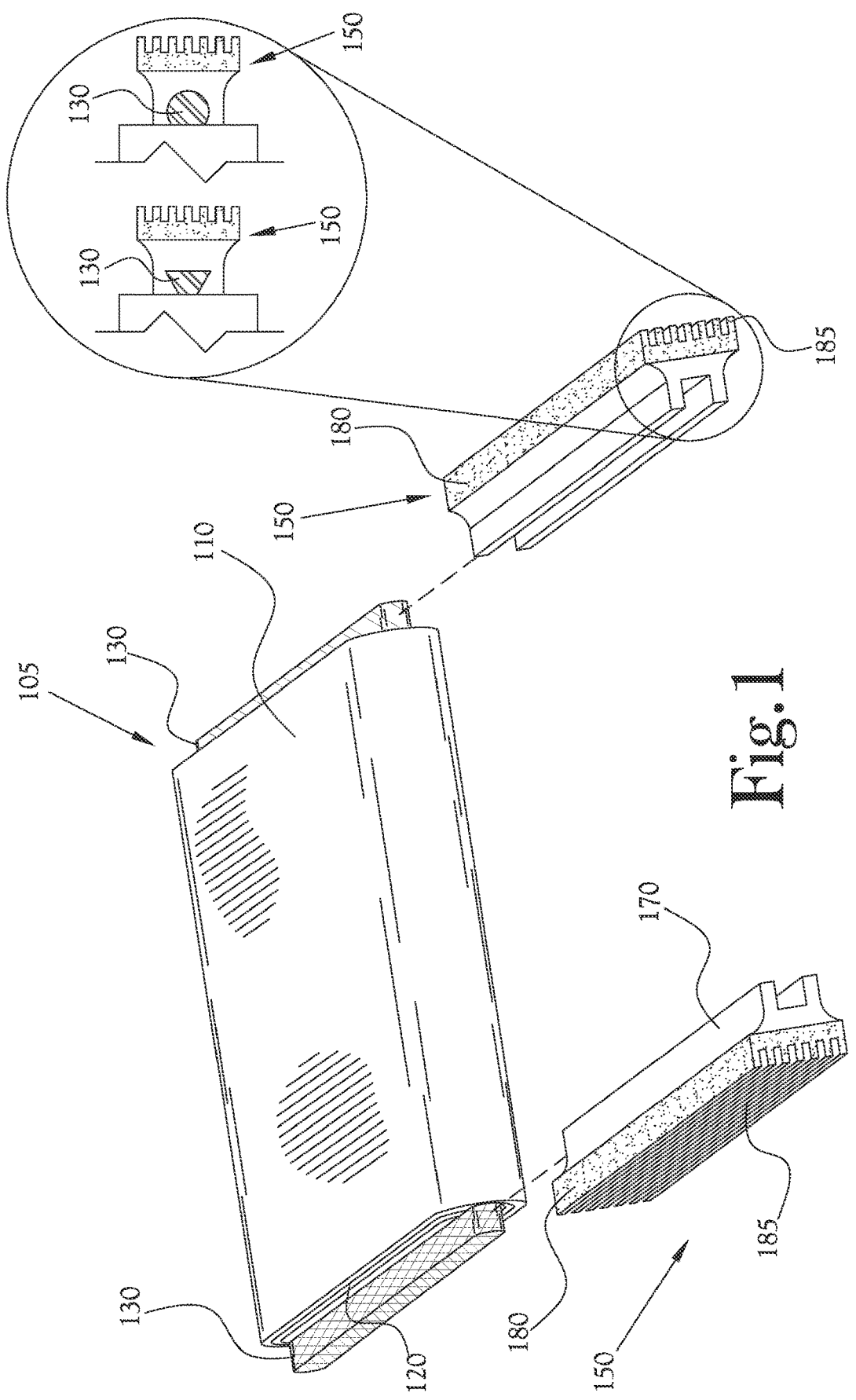
FIG. 1 represents a battery cell and a pair of heat transfer bars.

FIG. 1 represents a battery cell 105 and a pair of heat transfer bars 150. The cell 105 includes an exterior layer 110 of the polymeric material that forms the outside layers of the continuous sheet that also forms interior layers 120 of the cell 105. The polymeric material forming the exterior layer 110 is electrically insulative and a relatively poor thermal conductor. The cell 105 includes electrodes 130 formed from the anode and cathode layers that are continuous through the sheet and are separated by an electrically insulating spacer layer that also is continuous through the sheet. The electrodes 130 are made from an electrically and thermally conductive material, preferably a conductive metal such as copper, aluminum, and the like. The electrodes 130 extend outside of the exterior layer 110 of the polymeric material.

The heat transfer bars 150 are formed from an electrically and thermally conductive material, preferably a conductive metal such as copper, aluminum, steel, iron, and the like. Preferably, the heat transfer bars 150 are solid conductive metal. The heat transfer bars 150 hold through contact, such as ultrasonic welding or interference fit, with the electrodes 130. The heat transfer bars 150 may be force fit to the electrodes 130, may be heated and contacted with the electrodes to achieve an interference fit upon cooling to the temperature of the electrodes 130, or may be welded together, such as ultrasonically, and the like. While two heat transfer bars 150 are represented, one may be used on either of the two electrodes 130.

The heat transfer bars 150 are in close or direct contact with the electrodes 130 and thus preferably do not include a space where a liquid can readily flow between the electrodes 130 and the heat transfer bars 150. Thus, the heat transfer bars 150 preferably lack interior passages capable of transporting a liquid.

The heat transfer bars 150 contact at least 60% of a longitudinal length of the electrodes 130, preferably at least 80% of the longitudinal length of the electrodes 130. Preferably the heat transfer bars 150 are in contact with at least 70% of a lateral width of the exposed electrodes 130, more preferably at least 90% of a lateral width of the exposed electrodes 130. While the cell 105 is represented with rectangular shaped electrodes and thus corresponding rectangular shaped channels in the heat transfer bars 150, other geometric shapes may be used for the electrodes 130 and the heat transfer bars 150 that provide the desired contact between the two. For example, cross-sectionally circular or dove-tail shaped electrodes would have circular cross-section or dove-tail shaped heat transfer bars respectively, as shown in the figure inset.

The heat transfer bars 150 have a surface opposite where the electrodes 130 clamp that is coated with a thermally conductive and electrically insulative material. Thus, the heat transfer bars 150 have a first or inner side that is a thermally and electrically conductive side 170 contacting the electrode 130 and a second or outer side that is a thermally but not electrically conductive side 180 contacting an interior side of the battery case (not shown). The outer side 180 preferably includes a geometric pattern that forms an interfacing face 185.

The thermally conductive but electrically insulative material of the outer side 180 of the heat transfer bars 150 is preferably a dielectric material, such as anodizing, a non-electrically conductive paint, or a plasma electrolytic oxidation (PEO) coating, Preferably, the thermally conductive but electrically insulative material is a PEO material, such as available from Keronite, Greenwood IN or from IBC Group, Lebanon IN under the tradename Ceratough™.

Figure 2:
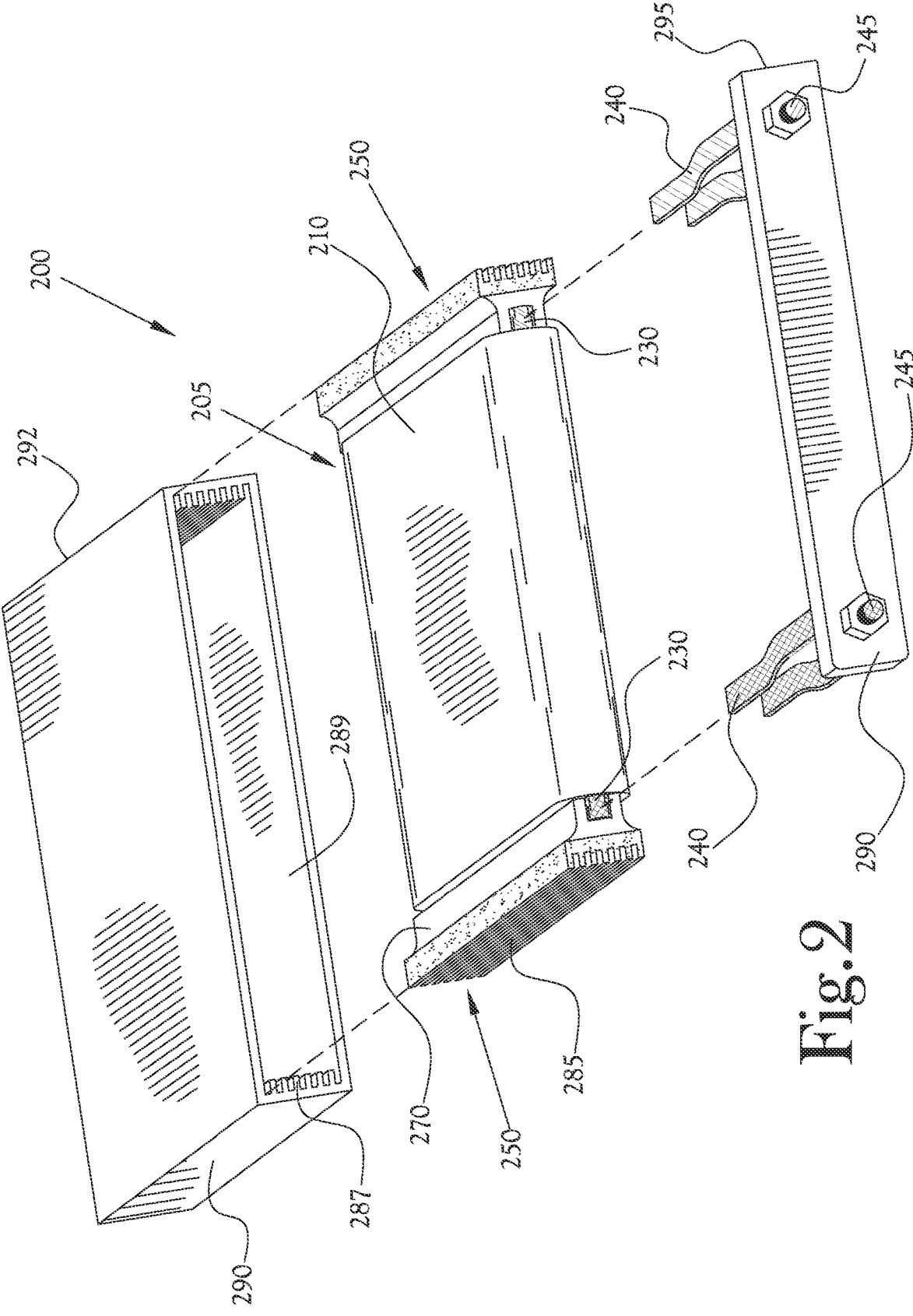
FIG. 2 represents a battery including a case that encloses a cell in thermal and electrical communication with heat transfer bars.

FIG. 2 represents a battery 200 including a case 290 that encloses a cell 205 in thermal and electrical communication with heat transfer bars 250. The battery 200 may be used individually or multiples of the battery 200 may be electrically combined to provide increased voltage and/or amperage. The case 290 includes a can 292 and a lid 295, where the lid 295 forms a seal (not shown) with the can 292. The case 290 is made from a thermally conductive material that may or may not be electrically conductive. Preferably, the case 290 is made from a metal, such as aluminum, steel, copper, magnesium, or the like. Preferably the seal between the can 292 and the lid 295 substantially excludes moisture from the cell 205, and more preferably substantially excludes moisture and air from the cell 205. The seal may be provided through laser welding, by metal edges that do or do not distort on compression, a gasket, an adhesive, combinations thereof, and the like and may or may not provide thermal conduction between the can 292 and the lid 295. Preferably, the seal is formed from laser welding the can 292 to the lid 295.

The can 292 provides the primary path for heat transfer, whether through convection or conduction, from the cell 205 and thus the battery 200. Substantially all the heat drawn from the interior layers of the cell 205 is passively transferred to the exterior surfaces of the can 292. Furthermore, at least 70% of the heat drawn from the cell 205 is passively transferred to exterior surfaces of the can 292, preferably at least 90% of the heat drawn from the cell 205 is passively transferred to the exterior surfaces of the can 292. While not shown in the figure, the case 290 may include one or more temperature sensors that sense the temperature of the can 292 and/or case 290, the cell 205, the electrodes 230, and/or heat transfer bars 250.

The can 292 preferably includes a receiving geometric pattern 287 on opposing interior sides that receives interfacing face 285 of the heat transfer bars 250. In this context "interfacing" preferably means that once joined, the heat transfer bars 250 and the receiving geometric pattern 287 on the interior of the can 292 limit movement of the heat transfer bars 250 in at least one dimension. While the figure represents the battery 200 as having two of the heat transfer bars 250 on opposite sides of the cell 205 and two of the receiving geometric patterns 287 on the opposite interior sides of the can 292, if less cooling is desired for the cell 205, a single heat transfer bar may be interfaced with a single receiving geometric pattern on the interior of the can 292.

The interfacing face 285 preferably contacts at least 60% of an interior length of the can 292, thus the can 292 preferably includes the receiving geometric pattern 287 along at least 60% of an interior length. The interior length may be a shorter or longer interior side of the can 292. More preferably, the interfacing face 285 contacts at least 80% of the interior length of the can 292, with the can 292 including the receiving geometric pattern 287 along at least 80% of the interior length. The contact between the electrodes 230 and the heat transfer bars 250 provides a primary thermal transfer path from the cell 205 to the exterior surfaces of the case 290 through conduction. With regard to the interfacing face 285, contact includes the circumstances where dielectric grease and other such materials are used to provide or enhance the contact, thus enhancing thermal conductivity in relation to having thermal insulation arising from an air-gap, and exclude contaminants.

In addition to the receiving geometric pattern 287, the can 292 preferably also includes one or more interior surfaces making contact with exterior layer 210 of the cell 205. More preferably, the can 292 includes two opposing interior surfaces making contact with the exterior layer 210 of the cell 205. The contact between the interior surface of the can 292 and the exterior layer 210 of the cell 205 provides a secondary thermal transfer path from the cell 205 to the exterior surfaces of the case 290 through conduction. However, as the primary thermal transfer path is from the electrodes 230 through the heat transfer bars 250 and into the case 290, the secondary thermal transfer between the exterior layer 210 and the case 290 may serve to heat the exterior layer 210, thus providing the benefit of a reduced temperature gradient across the exterior and interior layers of the cell 205. Additionally, if the can 292 is thermally insulated from the lid 295 by the seal, the temperature of the can 292 will be significantly higher than the temperature of the lid 295, as the lid 295 is thermally insulated from the can 292, which receives primary heat transfer from the heat transfer bars 250 and secondary heat transfer from the exterior layer 210.

The lid 295 includes electrode contacts 240 that establish electrical communication between electrodes 230 and battery posts 245. The contacts 240 reside in the interior of the case 290, while the posts 245 extend to the exterior of the case 290 to provide electricity to the load. The posts 245 are electrically insulated from the lid 295. While the lid 295 is preferably made from the same thermally conductive material as the can 292 for ease of manufacture, as the lid 295 may be formed from a relatively poor thermally conductive material in relation to the can 292. The lid 295 may be made from a polymeric and/or composite material that is thermally and/or electrically insulative. Thus, while preferable that the exterior surfaces of the case 290 are efficient thermal transmitters, thermal transfer from the cell 205 may be substantially limited to the can 292.

The contacts 240 are made from an electrically conductive material that also may be thermally conductive, such as copper, aluminum, steel, magnesium, and the like; however, the contacts 240 do not have to be thermally conductive. The posts 245 are made from an electrically conductive material that also may be thermally conductive, such as copper, lead, aluminum, and the like; however, the posts 245 do not have to be a good thermal conductor. Thus, unlike the can 292, the posts 245 do not have to be thermally conductive.

The contacts 240 engage with electrically and thermally conductive side 270 of the heat transfer bars 250 to establish electrical communication between the electrodes 230 and the posts 245, thus providing electrical communication between the "inside" and the "outside" of the battery 200. This engagement may be purely mechanical, such as when spring force holds the contacts 240 against the thermally conductive side 270 of the heat transfer bars 250 after the contacts 240 are forced onto the heat transfer bars 250. Engagement between the contacts 240 and the thermally conductive side 270 of the heat transfer bars 250 also may be permanent, such as when the contacts 240 and the thermally conductive side 270 of the heat transfer bars 250 are welded together. Ultrasonic welding is preferred.

Unlike the heat transfer bars 250 that engage at least 60% of the longitudinal length of the electrodes 230 to provide primary thermal transfer from the cell 205, the contacts 240 can engage a relatively small surface area of the conductive side 270 of the heat transfer bars 250 as efficient electrical communication and not thermal communication with the electrodes 230 is required. Preferably the relatively small surface area of the conductive side 270 of the heat transfer bars 250, is less than 30% of the longitudinal length of the first side of the heat transfer bars 250.

The posts 245 may provide a relatively minor third path of thermal transfer from the cell 205, but as the posts 245 are electrically insulated from the lid 295, and likewise substantially thermally insulated from the lid 295, heat does not effectively conductively transfer from the contacts 240 to the exterior surfaces of the case 290. This is very different that conventional designs requiring significant contact between the posts and the electrodes for cooling when both electrical and primary heat transfer from the cell is shared through the posts.

Figure 3:
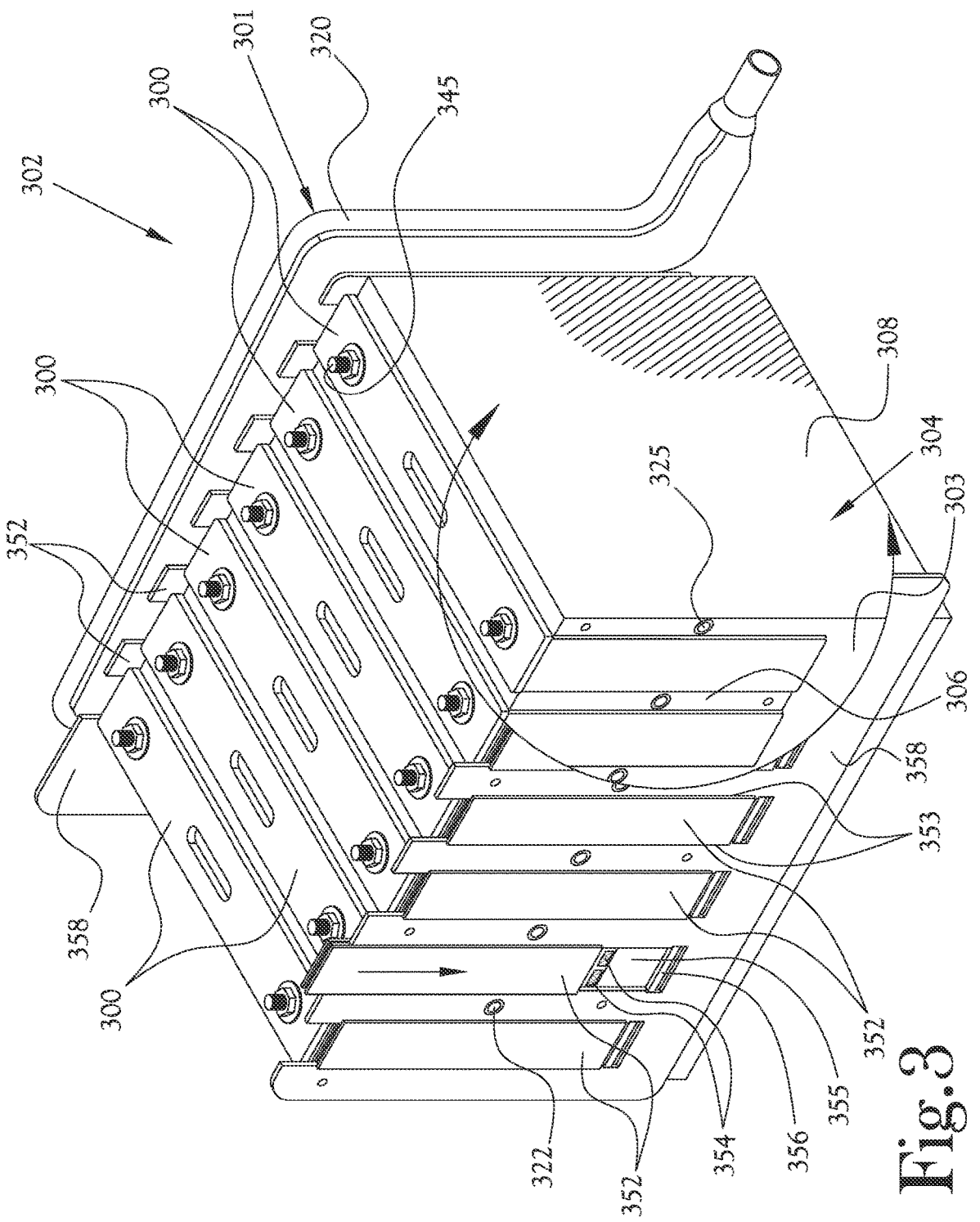
FIG. 3 represents a temperature-controlled power system including a thermal transfer system and multiple assembled batteries.

FIG. 3 represents a temperature-controlled power system 302 including a thermal transfer system 301 and multiple assembled batteries 300. The thermal transfer system 301 includes at least one radiator 320, and preferably includes at least one circuit board 358 and at least two active thermoelectric devices 352.

The batteries 300 of the temperature-controlled power system 302 may be conductively cooled by active thermoelectric devices 352 that are convectively cooled by the surrounding air. The batteries 300 may be conductively cooled by the one or more radiator 320 that transfers heat to the surrounding air and/or into a heat transfer fluid (not shown). The batteries 300 may be conductively cooled by active thermoelectric devices 352 that are conductively cooled by one or more radiator 320 that convectively transfers heat to the surrounding air or preferably transfers heat into a heat transfer fluid.

The heat originating from the multiple batteries 300 may be directly convectively transferred to the surrounding air, or conductively transferred to active thermoelectric devices that are then directly convectively cooled by the surrounding air. However, in either instance, the "surrounding air" may be replaced by one or more radiators 320 that adsorb the heat for transfer into the surrounding air and/or into a heat transfer fluid passing through the one or more of the radiators 320.

The temperature-controlled power system 302 includes battery carrier 304 that carries the batteries 300, optional circuit board 358 and TEDs 352, and optional radiator 320. As previously discussed, when the batteries are directly cooled by convection, the circuit board 358, TEDs 352, and radiator 320 are omitted. When the radiator 320 is in the form of a convective heat sink that conductively adsorbs heat from the batteries 300 and convectively radiates the heat to the surrounding air, the circuit board 358 and TEDs 352 may be omitted. When the TED's directly radiate heat to the surrounding air convectively, the radiator 320 may be omitted. Preferably, the temperature-controlled power system 302 includes the circuit board 358, the TEDs 352, and the radiator 320, thus having ability to conductively transfer heat from the batteries to the TEDs and then conductively transfer heat from the TEDs to the radiator, where the radiator transfers the adsorbed heat to a circulating heat transfer fluid—thus permitting the heat to be convectively lost at a location distanced from the temperature-controlled power system 302.

The battery carrier 304 preferably provides a base 303 on which the batteries 300 reside. The battery carrier 304 also preferably provides one or more divider and ends 306, 308 that separate the batteries 300 and that retain the vertical positioning of the batteries 300, respectively. While not shown in the image, the battery carrier 304 may omit the dividers 306 when thermal conductivity between the batteries 300 is desired. When the battery carrier 304 includes the dividers 306, the thermal insulation between the batteries 300 provided by the dividers 306 permits thermal control of each of the batteries 300 individually when individual active thermoelectric devices are used for cooling of the batteries 300. Thus, it is possible to heat a first subset of the batteries 300 while simultaneously cooling a second subset of the batteries 300. The ability to monitor and control the temperature of the batteries 300 individually is advantageous when multiple of the batteries 300 are electrically connected in series to increase voltage over that of a single battery or are electrically connected in parallel to increase current over that of a single battery. In either instance the batteries 300 on the "ends" of the battery carrier 304 have a tendency to heat at a slower rate than the batteries 300 at the "middle" of the battery carrier 304. Thus, individual battery temperature monitoring and control advantageously provides the benefit of a reduced temperature gradient across the batteries 300 when at least three of the batteries 300 are present.

The battery carrier 304 is preferably made from an electrically insulating and thermally insulative material, preferably a polymer composite, such as glass filled nylon, polypropylene, ABS, and the like. While a single material is represented in the figure, multiple insulative materials may be used to form the battery carrier 304. The battery carrier

304 may be formed from a single or from multiple parts, for example, when the divider and ends 306, 308 are separate parts that are attached to the base 303 of the battery carrier 304. The battery carrier 304 may include mounting points such as studs (not shown) and/or threaded inserts 325.

The circuit board 358 holds the active thermoelectric devices (TEDs) 352. The TEDs 352 have slots 353 on opposing longitudinal sides that permit the TEDs to slide into the circuit board 358 and be movement constrained in the dimensions perpendicular to the circuit board 358. The circuit board 358 includes cut-outs 355 to receive and hold the TEDs 352 and to prevent substantial side to side movement of the TEDs 352 in the plane of the circuit board 358. Thus, the TEDs 352 can move up and down in the plane of the circuit board 358, but the slots 353 prevent perpendicular movement in and out of the plane of the circuit board 358. The circuit board 358 preferably includes holes 322 that may be used to affix the circuit board 358 including the TEDs 352 to the battery carrier 304, thus creating contact between the TEDs 352 and the batteries 300.

The TEDs 352 slide into the cut-outs 355 of the circuit board 358 until electrical contacts 354 electrically and mechanically engage with circuit board connectors 356. Once the contacts 354 engage the connectors 356 through interference fit, the TEDs 352 can no longer freely move up and down in the plane of the circuit board 358. The sizing of the openings in the circuit board 358 correspond with the slots 353 in the TEDs 352. The sizing of the TEDs 352 preferably corresponds to the width and height of the exposed sides of the batteries 300. Thus, the TEDs 352 directly contact and conductively transfer heat from the individual cases of the batteries 300, preferably with an individual TED 352 or two for each battery 300, thus allowing individual batteries 300 to be heated or cooled.

The TEDs 352 do not directly contact or transfer heat from the battery posts 345 or associated bus bars and related structures (not shown) that may be used to carry the primary current to and from the batteries 300. Thus, the hot and cold sides of the TEDs 352 are not in contact with the primary current carrying components of the system, which facilitates manufacturing.

Preferably, at least 30% of the area of the side of each battery contacts and is thus in conductive thermal communication with a side of the corresponding TED 352, more preferably at least 60% of the area of the side of each battery is in contact and thus conductive thermal communication with a side of the corresponding TED 352. When the temperature-controlled power system 302 includes TEDs 352 on opposite sides of the batteries 300, as represented in the figure, each of the batteries 300 is in contact with two TEDs 352, one contacting each of the two opposing sides not contacting the battery carrier 304. Preferably, the TEDs 352 are not in contact with the top of the batteries 300, thus not in contact with the battery lids.

The radiator 320 may not include a heat transfer fluid, thus being a heatsink that directly transfers heat to the surrounding air through fins and the like. Preferably, the radiator 320 includes a heat transfer fluid which circulates through internal passageways in the radiator 320 to transfer heat from the TEDs 352 to the heat transfer fluid.

While one side of the temperature-controlled power system 302 is represented as a cut-away in this figure, thus showing one outer partial side of the batteries 300, a partial outer face of a first circuit board, a partial inner face of a second circuit board that is not obscured by the batteries 300, and a portion of a single radiator opposite the cut-away side not obscured by the circuit board, the temperature-controlled power system 302 may be similarly configured with a circuit board, TEDs, and radiator on one or more sides, preferably the two opposing longitudinal sides as represented in the figure.

Figures 4A, 4B:
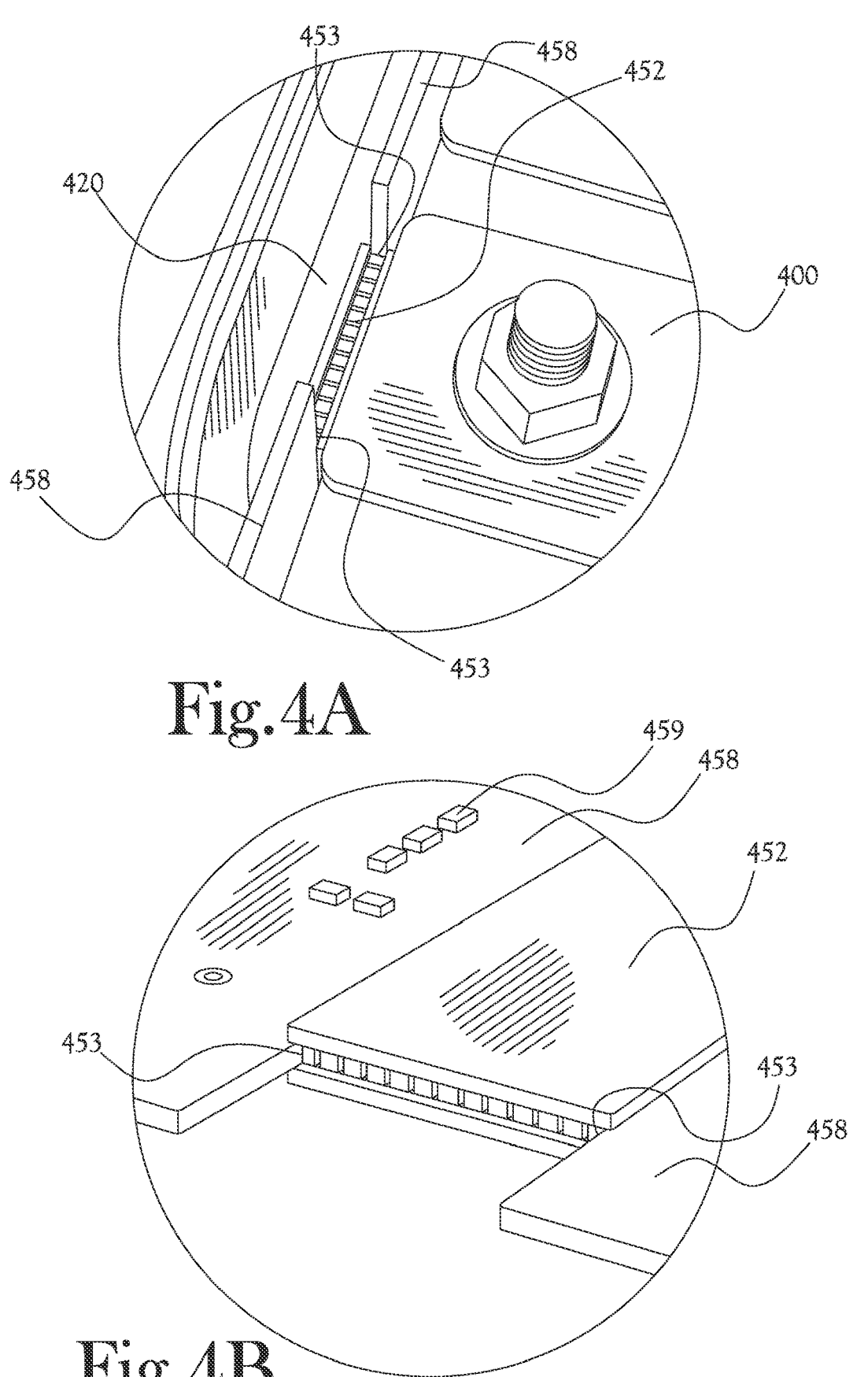
FIG. 4A represents a close-up and thus more detailed view of the temperature-controlled power system as previously represented in FIG. 3.
FIG. 4B represents a close-up and thus more detailed view of the TEDs held in the circuit board by the slots.

FIG. 4A represents a close-up and thus more detailed view of the temperature-controlled power system as previously represented in FIG. 3. Opposing, longitudinal slots 453 of the TEDs 452 are seen holding opposing longitudinal sides of the TEDs 452 in the plane of circuit board 458. The figure also represents that the width of the TED 452 approximately corresponds to the width of the battery 400, as is preferred. The TED 452 has a cold side in contact with the side of the battery 400, and a hot side in contact with radiator 420 when actively cooling the battery 400.

FIG. 4B represents a close-up and thus more detailed view of the TEDs 452 held in the circuit board 458 by the slots 453. Control circuitry 459 including at least one processor and memory storage is also represented on the circuit board 458 that can monitor temperature sensors (not shown), which may be placed inside or outside the case of the battery 400 to adjust the voltage and/or polarity of the potential applied to the TEDs 452 in response to temperature readings obtained from the sensors. The control circuitry 459 also may monitor temperature sensors (not shown) incorporated with the radiator 420 or a heat transfer fluid to further alter the voltage and/or polarity of the potential applied to the TEDs 452. By reversing the polarity between a first and a second opposite polarity input to the TEDs, the system can switch between cooling or heating the batteries 400, respectively.

The temperature sensors may be thermocouples or like physical devices, or other parameters of the batteries may be monitored, and these parameters turned into temperature readings of the batteries via an algorithm. Additionally, the side of one or more of the TEDs 452 contacting a battery may be used as a temperature sensor by measuring the Seebeck voltage across the TED. Other methods of obtaining temperature information may be used. While the figure represents the control circuitry 459 being incorporated into the circuit board 458, the control circuitry 459 may be remotely located and in electrical or wireless communication with the circuit board 458.

In view of the available temperature information, battery load, and the like, the control circuitry 459 also may alter the rate of heat transfer fluid flow through the radiator 420 by adjusting the operation of a circulating pump or similar fluid flow device (not shown). The control circuitry 459 preferably includes the ability to independently adjust the TED 452 or pair of TEDs 452 that cool or heat a single battery 400. In addition to adjusting the input to the TEDs 452 in response to the temperature sensors, the control circuitry 459 also may adjust the current outflow or inflow to individual batteries 400 or to all the batteries 400 to prevent damage to the batteries 400 under extreme load or charging conditions. Thus, the control circuitry 459 also may manage charging and/or discharging of the batteries 400 to optimize performance and/or longevity of the batteries 400.

Figure 4C:
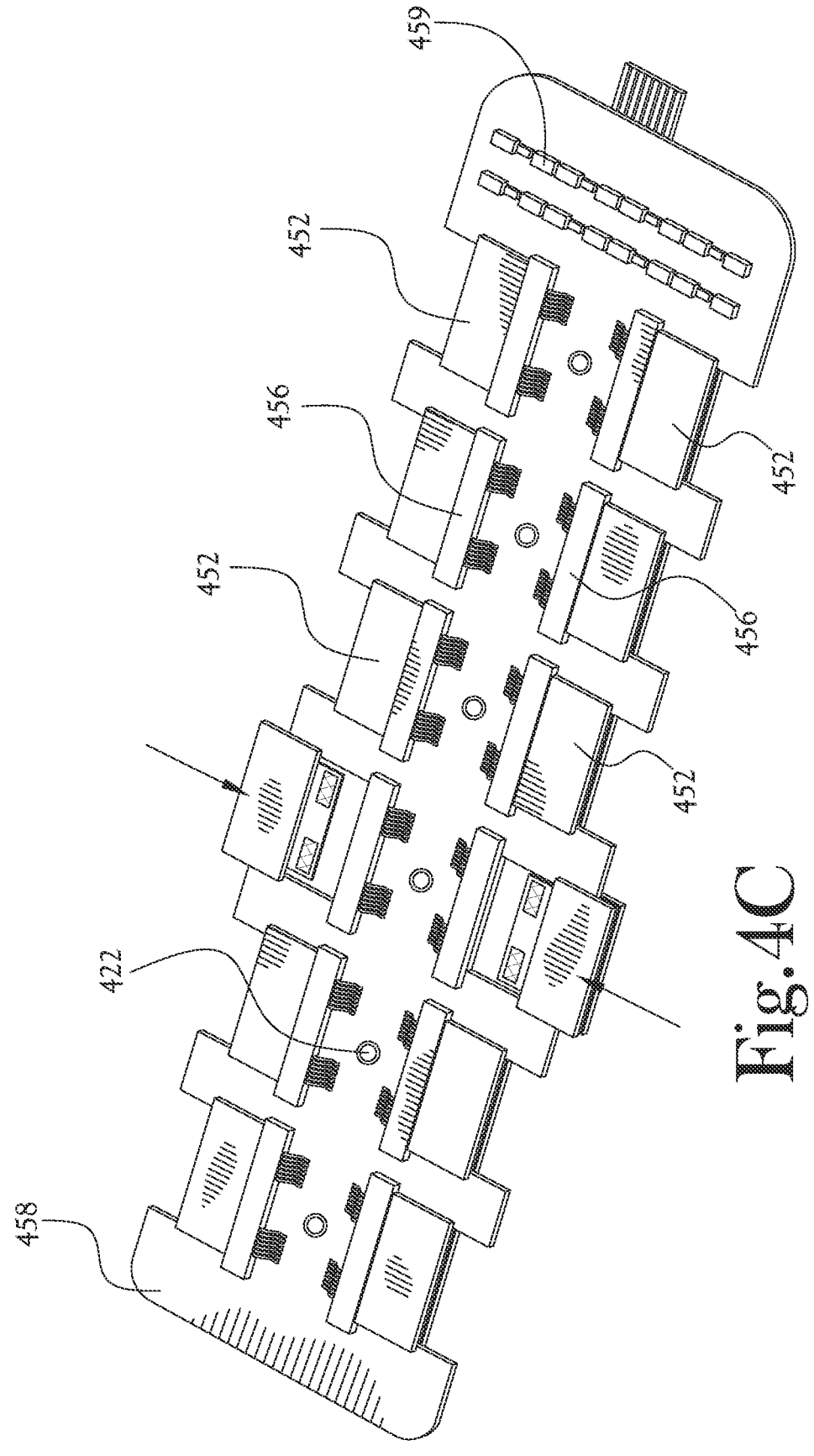
FIG. 4C represents an additional circuit board design where two TEDs reside on the same side at each battery position.

FIG. 4C represents an additional circuit board 458 design where two TEDs 452 reside on the same side at each battery location. As with the circuit board 458 design of FIG. 3, the TEDs 452 incorporate slots that slide into the circuit board 458 to constrain perpendicular movement of the TEDs 452 and engage a "bottom" connector to constrain planar movement while held in the circuit board 458. In this implementation, at each battery position the circuit board 458 includes two connectors 456 which engage a first TED 452 from the "top" and a second TED 452 from the "bottom". Thus, there are corresponding "top" and "bottom" connectors 456 that prevent the TEDs 452 from sliding out of the circuit board 458. The circuit board 458 includes the control circuitry 459 and holes 422 that may used to affix the circuit board 458 to the battery carrier, thus bringing the TEDs 452 in contact with the batteries. In this implementation, the control circuitry 459 has the additional ability to independently control the temperature of each battery, as a single circuit board may have two individually controllable TEDs 452 at each battery location.

Figures 5A, 5B:
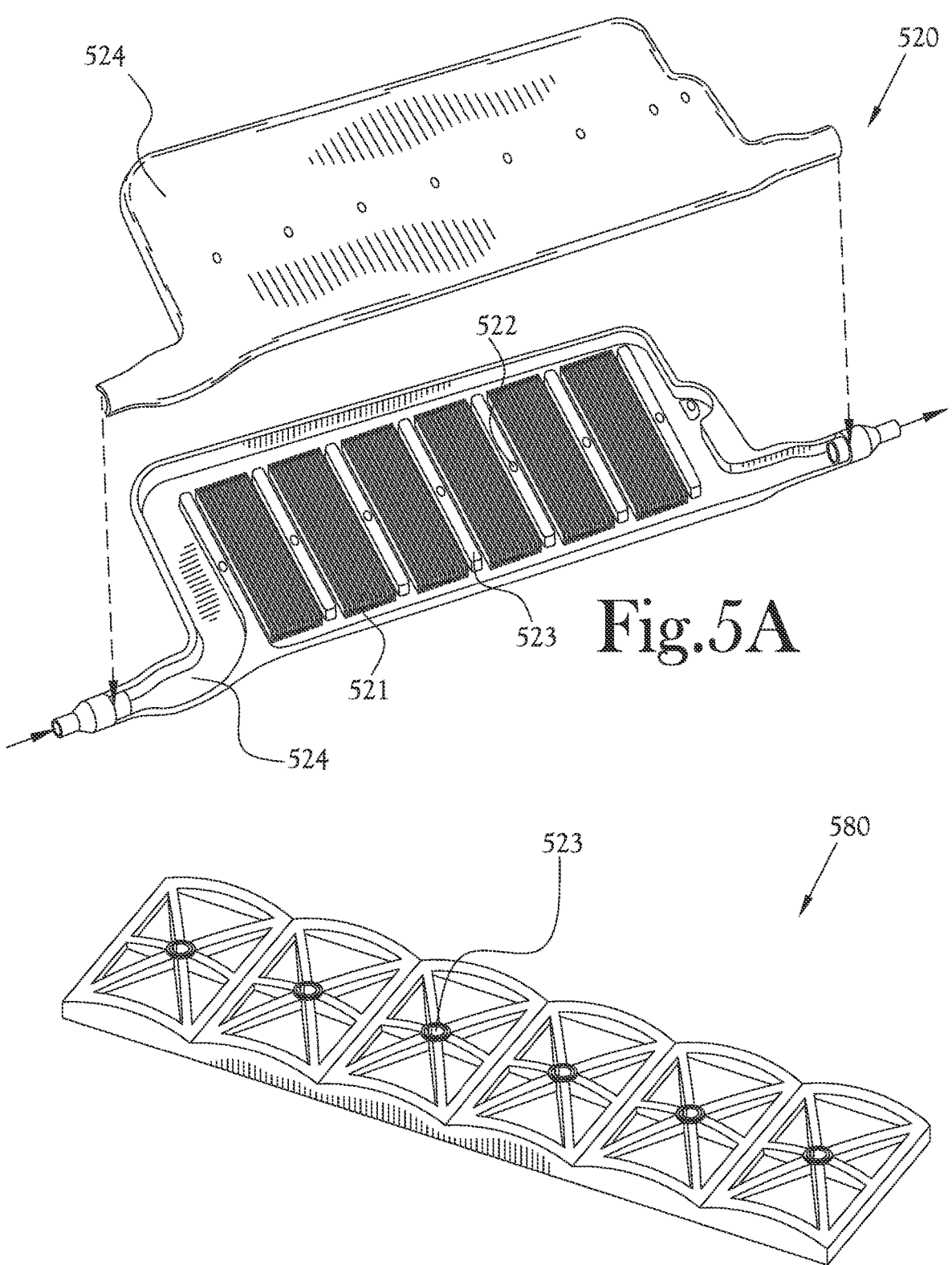
FIG. 5A represents one implementation of a radiator showing a cut-away of the interior.
FIG. 5B provides a representation of a compression plate including holes.

FIG. 5A represents one implementation of a radiator 520 showing a cut-away of the interior. The radiator 520 may have a "plate and fin" design as represented in the figure where there are fins 521 positioned within the interior between the two outer plates 524. Preferably, the fluid passages in the plates 524 are sized and configured so that fluid flow is substantially equalized through the fins 521. As represented in the figure, on the fluid inlet side the upper longitudinal portion of the plate starts at a larger diameter than where it ends, while the lower longitudinal fluid plate diameter is larger near the fluid exit. In this way larger inlet diameters to the fins are paired with smaller exit diameters from the fins so fluid flow is equalized through the multiple sets of the fins 521.

Heat is removed from the radiator 520 by a heat transfer fluid (not shown) flowing through the radiator 520. The heat transfer fluid includes fluids that transfer heat primarily through a phase change.

The radiator 520 may include attachment spacers 523 that contact the battery carrier and that include holes 522 that may be used to affix the radiator 520 to the TEDs, and then to the battery carrier. The spacers 523 provide a solid surface for the holes 522 and assist in preventing the fins 521 from being damaged when the radiator 520 is tightly affixed.

The fins 521 are preferably positioned where the TEDs are located in the circuit board to enhance cooling within the radiator 520 at these locations and to assist in providing structural integrity to the radiator 520 when the radiator is tightly affixed. While a specific plate and fin implementation is represented in the figure, other implementations may be used that provide the desired contact with the TEDs.

FIG. 5B provides a representation of a compression plate 580 including holes 523. The compression plate 580 may be placed on the outside face of the radiator 520 to provide a clamping force that holds the radiator 520 to the TEDs of the circuit board and then the TEDs to the batteries. Studs (not shown) may be provided in the battery carrier that extends through the holes in the circuit board, the holes 522 in the radiator 520, and through the holes 523 in the compression plate 580. Nuts (not shown) may then be threaded onto the studs to apply compression force to the compression plate 580, thus applying relatively even compression force to hold the radiator and the circuit board to the batteries and the battery carrier. Alternatively, bolts (not shown) may be passed through the holes 523 that thread into threaded inserts (not shown) in the battery carrier to provide a similar compression force to the compression plate 580. Alternatively, if the battery carrier lacks thermal spacers between the batteries, thus placing the battery cases in contact, the sides of the battery cases may be equipped with studs for attachment of the compression plate 580.

To provide a clear and more consistent understanding of the specification and claims of this application, the following definitions are provided.

Conduction is the transfer of heat through contact with a solid.

Convection is the transfer of heat through the movement of a contacted fluid.

Thermoelectric devices (TEDs) are solid-state devices that provide a cold side and a hot side in response to an electrical input. Thus, when an electric potential is applied to a thermoelectric device, the device moves heat from the cold side of the device to the hot side of the device. Reversing the applied potential results in heat traveling through the device in the opposite direction, thus reversing the hot and cold sides of the device. Devices of this type are often referred to as Peltier coolers.

Surrounding air in most instances will be the ambient atmosphere able to convectively absorb heat from a heated surface contacting the air. However, it is possible to replace the surrounding air with a device and/or fluids other than air that continue to move the heat for final transfer to the air, earth, and the like.

Note that spatially relative terms, such as "up," "down," "right," "left," "beneath," "below," "lower," "above," "upper", "top", "bottom", and the like, may be used for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below", or "beneath" other elements or features would then be oriented "above" the other elements or features. Thus, the exemplary term "below" can encompass both an orientation of above and below in relation to another element or feature. The device may be otherwise oriented (rotated 90 degrees or at other orientations) and the spatially relative descriptors used herein interpreted accordingly.

The simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

While various aspects of the invention are described, it will be apparent to those of ordinary skill in the art that other embodiments and implementations are possible within the scope of the invention. Accordingly, the invention is not to be restricted except in light of the attached claims and their equivalents.

The invention claimed is:

1. A temperature-controlled power system, the temperature-controlled power system comprising:
   batteries; and
   a thermal transfer system, where the thermal transfer system comprises:
     at least one circuit board;
     control circuitry in electrical or wireless communication with the at least one circuit board;
     at least two active thermoelectric devices held by the at least one circuit board, where
       each of the at least two active thermoelectric devices contacts and is in thermal communication with a different battery;
       the at least one circuit board comprising cut-outs to receive and hold the at least two active thermoelectric devices;
     at least one radiator in conductive heat transfer with the at least two active thermoelectric devices; and at least 30% of the area of at least one side of each case of the batteries contacts and is in thermal communication with the at least two active thermoelectric devices.

2. The power system of claim 1, further comprising a battery carrier that carries the batteries.

3. The power system of claim 2, the battery carrier comprising a base on which the batteries reside.

4. The power system of claim 3, the battery carrier further comprising one or more divider between the batteries and opposing ends of the batteries.

5. The power system of claim 2, where the battery carrier comprises a thermally insulative material.

6. The power system of claim 2, where the battery carrier further comprises mounting points chosen from studs and threaded inserts.

7. The power system of claim 2, where the batteries comprise cases having studs configured to attach a compression plate.

8. The power system of claim 2, the at least one radiator comprising fins contacting the at least two active thermoelectric devices and attachment spacers contacting the battery carrier.

9. The power system of claim 1, the at least two active thermoelectric devices comprising opposing longitudinal slots on opposing longitudinal sides configured to mechanically engage the cut-outs of the at least one circuit board.

10. The power system of claim 1, the at least two active thermoelectric devices comprising contacts that mechanically engage and establish electrical communication with connectors of the at least one circuit board.

11. The power system of claim 10, the connectors configured to prevent the at least two active thermoelectric devices from moving up and down freely in the plane of the at least one circuit board.

12. The power system of claim 11, the at least two active thermoelectric devices comprising slots on opposing sides and contacts on a bottom side to mechanically engage the cut-outs on opposing sides and the connectors of the at least one circuit board.

13. The power system of claim 1, the at least one circuit board configured to allow the at least two active thermoelectric devices to slide into the at least one circuit board and be movement constrained in dimensions perpendicular to the at least one circuit board.

14. The power system of claim 1, where the at least two active thermoelectric devices are sized to correspond to a width and height of exposed sides of the batteries.

15. The power system of claim 1, where each case of the batteries contacts and is in thermal communication with a pair of the at least two active thermoelectric devices on opposing sides of the case.

16. The power system of claim 1, the control circuitry configured to monitor temperature sensors inside the batteries, outside the batteries, or both inside and outside the batteries.

17. The power system of claim 1, the control circuitry configured to adjust a voltage applied to the at least two active thermoelectric devices.

18. The power system of claim 1, the control circuitry configured to adjust a voltage flowing from or into the batteries.

19. The power system of claim 1, the control circuitry configured to estimate a temperature of the batteries in response to a voltage obtained from the at least two active thermoelectric devices.

20. The power system of claim 1, the control circuitry configured to monitor and control the temperature of the batteries individually.

21. The power system of claim 20, the control circuitry configured to heat a first battery and cool a second battery of the batteries.

22. The power system of claim 1, the at least one radiator comprising a heat transfer fluid.

23. The power system of claim 22, the control circuitry configured to alter a flow rate of the heat transfer fluid through the at least one radiator.

24. The power system of claim 1, the at least one radiator comprising a solid heat sink lacking a heat transfer fluid.

25. The power system of claim 22, the at least one radiator comprising a plate and fin design.

26. The power system of claim 25, where the plates are configured to match larger diameter fin entrances with smaller diameter fin exits and to match smaller diameter fin entrances with larger diameter fin exits.

27. The power system of claim 1, further comprising a compression plate configured to apply a clamping force against the at least one radiator.

28. The power system of claim 1, where the at least two active thermoelectric devices comprise at least four active thermoelectric devices, the at least one circuit board comprises at least two circuit boards, where each of the at least two circuit boards hold at least two of the at least four active thermoelectric devices, and the at least one radiator comprises at least two radiators, where each of the at least two radiators contacts at least two of the at least four active thermoelectric devices.

29. The power system of claim 1, where the batteries each comprise:

the case of each of the batteries comprising a can attached to a lid, where the case comprises a seal between the can and the lid;

a cell having first and second electrodes exposed from an exterior layer of polymeric material of the cell, the at least two electrodes comprising an anode electrode and a cathode electrode, where the case encloses the cell;

at least two posts exposed from the case;

at least two contacts enclosed by the case, where a first of the at least two posts is in electrical communication with a first of the at least two contacts and a second of the at least two posts is in electrical communication with a second of the at least two contacts; and at least a first heat transfer bar in electrical and thermal communication with the first electrode and the first of the at least two contacts, where the first heat transfer bar mechanically holds the first electrode, the first heat transfer bar comprises a first side that is thermally and electrically conductive and a second side that is thermally but not electrically conductive, and where the second side of the first heat transfer bar contacts at least one inner side of the can and the can provides the primary path for heat transfer from the cell.

\*   \*   \*   \*   \*